United States Patent
Yamamoto et al.

(10) Patent No.: US 9,026,286 B2
(45) Date of Patent: May 5, 2015

(54) HYBRID PLUG-IN VEHICLE CONTROL DEVICE

(75) Inventors: Masaya Yamamoto, Kasugai (JP); Hiroyuki Takayanagi, Toyokawa (JP)

(73) Assignees: Toyota Jidosha Kabushiki Kaisha, Aichi-ken (JP); Denso Corporation, Aichi-ken (JP)

( * ) Notice: Subject to any disclaimer, the term of this patent is extended or adjusted under 35 U.S.C. 154(b) by 103 days.

(21) Appl. No.: 13/640,830

(22) PCT Filed: Apr. 13, 2011

(86) PCT No.: PCT/IB2011/000819
§ 371 (c)(1),
(2), (4) Date: Oct. 12, 2012

(87) PCT Pub. No.: WO2011/128763
PCT Pub. Date: Oct. 20, 2011

(65) Prior Publication Data
US 2013/0030637 A1    Jan. 31, 2013

(30) Foreign Application Priority Data
Apr. 14, 2010    (JP) ................. 2010-093256

(51) Int. Cl.
| G06F 17/00 | (2006.01) |
| G06F 7/00 | (2006.01) |
| B60W 20/00 | (2006.01) |
| B60K 6/445 | (2007.10) |
| B60W 30/18 | (2012.01) |

(Continued)

(52) U.S. Cl.
CPC ............... *B60K 6/445* (2013.01); *B60W 10/08* (2013.01); *B60W 30/18054* (2013.01); *B60W 2510/244* (2013.01); *F16H 57/0441* (2013.01); *Y02T 10/6239* (2013.01); *Y02T 10/6269* (2013.01); *Y02T 90/14* (2013.01)

(58) Field of Classification Search
CPC ........ B60L 1/003; B60L 15/20; B60W 10/08; B60W 10/30
USPC ........ 701/22, 36; 180/65.265, 65.275, 65.285
See application file for complete search history.

(56) References Cited

U.S. PATENT DOCUMENTS

| 3,870,855 A | 3/1975 | Edlund et al. |
| 2004/0108149 A1* | 6/2004 | Adachi et al. ................ 180/65.2 |

(Continued)

FOREIGN PATENT DOCUMENTS

| CN | 101163600 A | 4/2008 |
| CN | 101298248 A | 11/2008 |

(Continued)

OTHER PUBLICATIONS

International Search Report and Written Opinion for corresponding International Patent Application No. PCT/IB2011/000819 mailed Sep. 6, 2011.

*Primary Examiner* — Fadey Jabr
*Assistant Examiner* — Aaron L Troost
(74) *Attorney, Agent, or Firm* — Sughrue Mion, PLLC (57) ABSTRACT

A plugin hybrid vehicle is installed with an engine, an oil pump coupled to an output shaft of the engine to be driven by the engine, a motor/generator coupled to the output shaft of the engine, and a battery. An ECU controls the motor/generator to rotate the output shaft of the engine during charging of the battery using power supplied from a power source on the exterior of the plugin hybrid vehicle.

6 Claims, 11 Drawing Sheets

(51) Int. Cl.
*B60W 10/08* (2006.01)
*F16H 57/04* (2010.01)

(56) References Cited

U.S. PATENT DOCUMENTS

| | | | |
|---|---|---|---|
| 2008/0234915 A1* | 9/2008 | Nomasa et al. | 701/102 |
| 2008/0275600 A1* | 11/2008 | Rask et al. | 701/22 |
| 2009/0064695 A1* | 3/2009 | Kojima | 62/230 |
| 2010/0038160 A1 | 2/2010 | Osawa | |
| 2010/0072954 A1* | 3/2010 | Kohn et al. | 320/152 |
| 2011/0213521 A1* | 9/2011 | Ito et al. | 701/22 |

FOREIGN PATENT DOCUMENTS

| | | |
|---|---|---|
| DE | 197 45 167 A1 | 6/1998 |
| JP | 08-268036 A | 10/1996 |
| JP | 2008-238837 A | 10/2008 |
| JP | 2008-238912 A | 10/2008 |
| JP | 2008-296698 A | 12/2008 |
| JP | 2008-308124 A | 12/2008 |
| JP | 2011-178181 A | 9/2011 |

\* cited by examiner

HYBRID PLUG-IN VEHICLE CONTROL DEVICE

BACKGROUND OF THE INVENTION

1. Field of the Invention

The invention relates to a vehicle control system used in a vehicle that is installed with an engine and an oil pump driven by the engine and is capable of traveling using power stored in a storage device.

2. Description of Related Art

A hybrid vehicle installed with an engine such as an internal combustion engine and a motor as drive sources is available. A hybrid vehicle is installed with a storage device such as a battery that stores power supplied to the motor. Power generated by a power generator driven by the engine, power regenerated using the motor during deceleration of the vehicle, and so on are charged to the battery. A plugin hybrid vehicle, which is a type of hybrid vehicle, is also capable of charging the battery using power supplied from the exterior of the hybrid vehicle.

This type of hybrid vehicle is capable of traveling using one or both of the engine and the motor as a drive source in accordance with an operating condition of the vehicle and so on. Accordingly, the hybrid vehicle is capable of traveling using only the motor as a drive source, i.e. while the engine is stopped.

In a traveling condition where the engine is stopped and only the motor is used as a drive source, exhaust gas is not discharged, and therefore a small load is placed on the environment. It is therefore preferable to enable travel in the condition where the engine is stopped as much as possible. Accordingly, a plugin hybrid vehicle in particular is more likely to be used while the engine is stopped in order to increase a time and a distance of travel using only the motor as a drive source, and as a result, an increase is likely to occur in a time during which an oil pump coupled to the engine is not driven. When the time during which the oil pump is not driven increases, an amount of oil supplied to lubricate a drive train and so on may decrease. Therefore, a technique for driving an internal combustion engine used as the engine forcibly when a predetermined condition is satisfied has been proposed.

Japanese Patent Application Publication No. 2008-238837 (JP-A-2008-238837) discloses a control apparatus for a hybrid vehicle driving apparatus in which the need to supply lubricating oil to at least a part of a power transmission device using a lubricating oil supply device is determined on the basis of a distance traveled using the motor after halting rotational driving of the internal combustion engine, and the internal combustion engine is driven to rotate on the basis of the determination.

SUMMARY OF THE INVENTION

However, when the internal combustion engine is started using the technique described in JP-A-2008-238837, fuel consumption may increase. Further, when an amount of fuel stored in a fuel tank is small, the internal combustion engine cannot be started. In this case, the oil pump cannot be driven.

An object of the invention is to provide a vehicle control system with which an oil pump can be driven without an increase in fuel consumption.

A vehicle control system according to a first embodiment is used in a vehicle that is installed with an internal combustion engine, an oil pump coupled to an output shaft of the internal combustion engine to be driven by the internal combustion engine, and a storage device for storing power, and that is capable of traveling using the power stored in the storage device. The control system includes: a rotating electrical machine coupled to the output shaft of the internal combustion engine; and a control device that controls the rotating electrical machine to rotate the output shaft of the internal combustion engine during charging of the storage device with power supplied from an exterior of the vehicle.

According to this constitution, the output shaft of the internal combustion engine is rotated by driving the internal combustion engine during charging of the storage device. Therefore, the oil pump can be driven without consuming fuel. As a result, a vehicle control system with which an oil pump can be driven without an increase in fuel consumption can be provided.

In the vehicle control system according to the above embodiment, the control device may control the rotating electrical machine to rotate the output shaft of the internal combustion engine when a state of charge of the storage device is larger than a threshold during charging of the storage device using the power supplied from the exterior of the vehicle.

According to this constitution, the oil pump can be driven using the rotating electrical machine when the state of charge of the storage device is larger than the threshold such that an increase is expected to occur in a distance traveled using the power stored in the storage device while the internal combustion engine is stopped. As a result, oil can be supplied from the oil pump in advance in order to lubricate a drive train or the like.

A vehicle control system according to a second embodiment may further include a setting device that sets a timing for controlling the rotating electrical machine to rotate the output shaft of the internal combustion engine in response to an operation performed by a user of the vehicle. The control device may control the rotating electrical machine to rotate the output shaft of the internal combustion engine at the timing set by the setting device during charging of the storage device using the power supplied from the exterior of the vehicle.

According to this constitution, the control device can drive the rotating electrical machine at a timing set as desired by the user while the storage device is charged with the power supplied from the exterior of the vehicle.

A vehicle control system according to a third embodiment may further include an air-conditioning device that operates in response to an operation performed by a user of the vehicle from the exterior of the vehicle. The control device may control the rotating electrical machine to rotate the output shaft of the internal combustion engine by driving the rotating electrical machine when the user of the vehicle performs an operation from the exterior of the vehicle to operate the air-conditioning device during charging of the storage device using the power supplied from the exterior of the vehicle.

According to this constitution, the oil pump can be driven using the rotating electrical machine when preparation for vehicle travel begins. As a result, oil can be supplied from the oil pump at a predicted timing at which lubrication of the drive train or the like will be required.

The vehicle control system according to the above embodiments may further include: a catalyst for purifying an exhaust gas discharged from the internal combustion engine; and a heater for warming the catalyst. The heater may be controlled to warm the catalyst when the rotating electrical machine is controlled to rotate the output shaft of the internal combustion engine.

According to this constitution, the catalyst can be operated correctly in a situation where a large amount of unburned air is supplied to the catalyst when the output shaft of the internal combustion engine is driven by the rotating electrical machine.

BRIEF DESCRIPTION OF THE DRAWINGS

The features, advantages, and technical and industrial significance of exemplary embodiments of the invention will be described below with reference to the accompanying drawings, in which like numerals denote like elements, and wherein.

DETAILED DESCRIPTION OF EMBODIMENTS

Embodiments of the invention will be described below with reference to the drawings. In the following description, identical components have been allocated identical reference symbols, and the names and functions thereof are also identical. Hence, detailed description of these components will not be repeated.

Referring to FIGS. 1 to 8, a first embodiment will be described. A plugin hybrid vehicle is installed with an engine 100, a first motor/generator 110, a second motor/generator 120, a power division mechanism 130, a reduction gear 140, and a battery 150.

Figure 1:
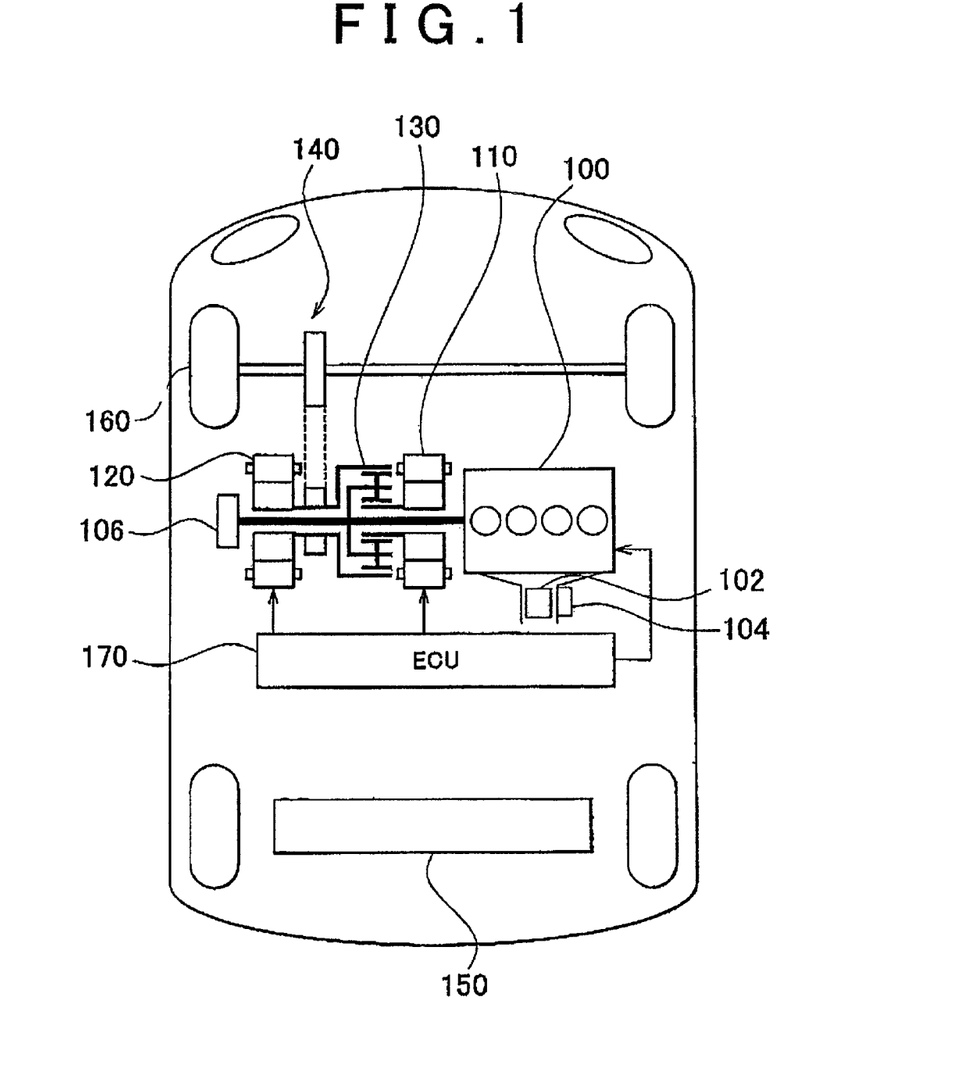
FIG. 1 is a schematic constitutional diagram showing a plugin hybrid vehicle according to a first embodiment.

The engine 100, the first motor/generator 110, the second motor/generator 120, and the battery 150 are controlled by an ECU 170. The ECU 170 may be divided into a plurality of ECUs.

The vehicle travels using drive power from at least one of the engine 100 and the second motor/generator 120. In other words, one or both of the engine 100 and the second motor/generator 120 is selected automatically as a drive source in accordance with an operating condition.

For example, when an accelerator opening is small, when a vehicle speed is low, and so on, the plugin hybrid vehicle travels using only the second motor/generator 120 as the drive source. In this case, the engine 100 is stopped.

Further, when the accelerator opening is large, when the vehicle speed is high, when a state of change (SOC) of the battery 150 is small, and so on, the engine 100 is driven. In this case, the plugin hybrid vehicle travels using only the engine 100 or both the engine 100 and the second motor/generator 120 as the drive source.

Furthermore, the vehicle travels while switching automatically between a CS mode and a CD mode, for example. Note that the CS mode and the CD mode may be switched manually.

In the CS mode, the plugin hybrid vehicle travels while maintaining a power stored in the battery 150 at a predetermined target value.

In the CD mode, the power stored in the battery 150 is not maintained for travel, and the plugin hybrid vehicle travels mainly under the drive power of the second motor/generator 120 alone using this power. Note, however, that when the accelerator opening is large, the vehicle speed is high, and so on in the CD mode, the engine 100 may be driven to supplement the drive power.

The CS mode may also be referred to as a hybrid vehicle (HV) mode. Similarly, the CD mode may also be referred to as an electric vehicle (EV) mode. The CS mode and the CD mode will be described in further detail below.

The engine 100 is an internal combustion engine. By burning an air-fuel mixture of fuel and air in a combustion chamber, a crankshaft serving as an output shaft rotates. Exhaust gas discharged from the engine 100 is purified by a catalyst 102 and then discharged to a vehicle exterior. The catalyst 102 exhibits a purification action when warmed to a specific temperature. The catalyst 102 is warmed using heat of the exhaust gas. The catalyst 102 is a three-way catalyst, for example. A heater 104 for warming the catalyst 102 is provided in the vicinity of the catalyst 102. The heater 104 generates heat using power supplied by an auxiliary battery (not shown), for example. As will be described below, when the first motor/generator 110 is controlled such that the output shaft (the crankshaft) of the engine 100 rotates, the heater 104 is controlled to warm the catalyst 102. Note that the heater 104 does not have to be provided.

The plugin hybrid vehicle is further provided with an oil pump 106 that is coupled to the output shaft of the engine 100 so as to be driven by the engine 100. The oil pump 106 discharges oil for lubricating a differential gear and an accelerator of a drive train, and so on.

The engine 100, the first motor/generator 110, and the second motor/generator 120 are connected via the power division mechanism 130. Power generated by the engine 100 is divided into two paths by the power division mechanism 130. One path is for driving a front wheel 160 via the reduction gear 140, and the other path is for generating power by driving the first motor/generator 110.

The first motor/generator 110 is a three-phase alternating current rotating electrical machine including a U phase coil, a V phase coil, and a W phase coil. The first motor/generator 110 generates power using the power of the engine 100 divided by the power division mechanism 130. The power generated by the first motor/generator 110 is divided in accordance with traveling conditions of the vehicle and the state of charge of the battery 150. For example, under normal traveling conditions, the power generated by the first motor/generator 110 is used as is to drive the second motor/generator 120. When the state of charge of the battery 150 is lower than a predetermined value, on the other hand, the power generated by the first motor/generator 110 is converted from an alternating current into a direct current by an inverter, to be described below. A voltage of the converted direct current power is then adjusted by a converter, to be described below, whereupon the power is stored in the battery 150.

When the first motor/generator 110 is used as a power generator, the first motor/generator 110 generates negative torque. Here, negative torque denotes torque acting as a load on the engine 100. When the first motor/generator 110 is used as a motor while receiving a power supply, the first motor/generator 110 generates positive torque. Here, positive torque denotes torque that does not act as a load on the engine 100, or in other words torque for assisting rotation of the engine 100. Note that this applies similarly to the second motor/generator 120.

The second motor/generator 120 is a three-phase alternating current rotating electrical machine including a U phase coil, a V phase coil, and a W phase coil. The second motor/generator 120 is driven using at least one of the power stored in the battery 150 and the power generated by the first motor/generator 110.

The drive power of the second motor/generator 120 is transmitted to the front wheel 160 via the reduction gear 140. As a result, the second motor/generator 120 assists the engine 100 and the vehicle travels using the drive power of the second motor/generator 120. In other words, the plugin hybrid vehicle is capable of traveling using the power stored in the battery 150. Note that a rear wheel may be driven instead of or in addition to the front wheel 160.

During regenerative braking in the plugin hybrid vehicle, the second motor/generator 120 is driven by the front wheel 160 via the reduction gear 140 such that the second motor/generator 120 operates as a power generator. As a result, the second motor/generator 120 operates as a regenerative brake for converting brake energy into electric power. The power generated by the second motor/generator 120 is stored in the battery 150.

The power division mechanism 130 is constituted by a planetary gear including a sun gear, a pinion gear, a carrier, and a ring gear. The pinion gear engages with the sun gear and the ring gear. The carrier supports the pinion gear to be capable of spinning. The sun gear is coupled to a rotary shaft of the first motor/generator 110. The carrier is coupled to the crankshaft of the engine 100. The ring gear is coupled to a rotary shaft of the second motor/generator 120 and the reduction gear 140.

The engine 100, the first motor/generator 110, and the second motor/generator 120 are coupled via the power division mechanism 130 constituted by a planetary gear, and as a result, respective rotation speeds of the engine 100, the first motor/generator 110, and the second motor/generator 120 are linked by a straight line on a collinear diagram. In other words, the first motor/generator 110 is coupled to the output shaft of the engine 100 via the power division mechanism 130.

The battery 150 is a battery pack formed by connecting in series a plurality of battery modules in which respective pluralities of battery cells are integrated. A voltage of the battery 150 is approximately 200 V, for example. As well as power from the first motor/generator 110 and second motor/generator 120, power supplied from a power source on the exterior of the vehicle is charged to the battery 150. Note that a capacitor may be used instead of or in addition to the battery 150.

Figure 2:
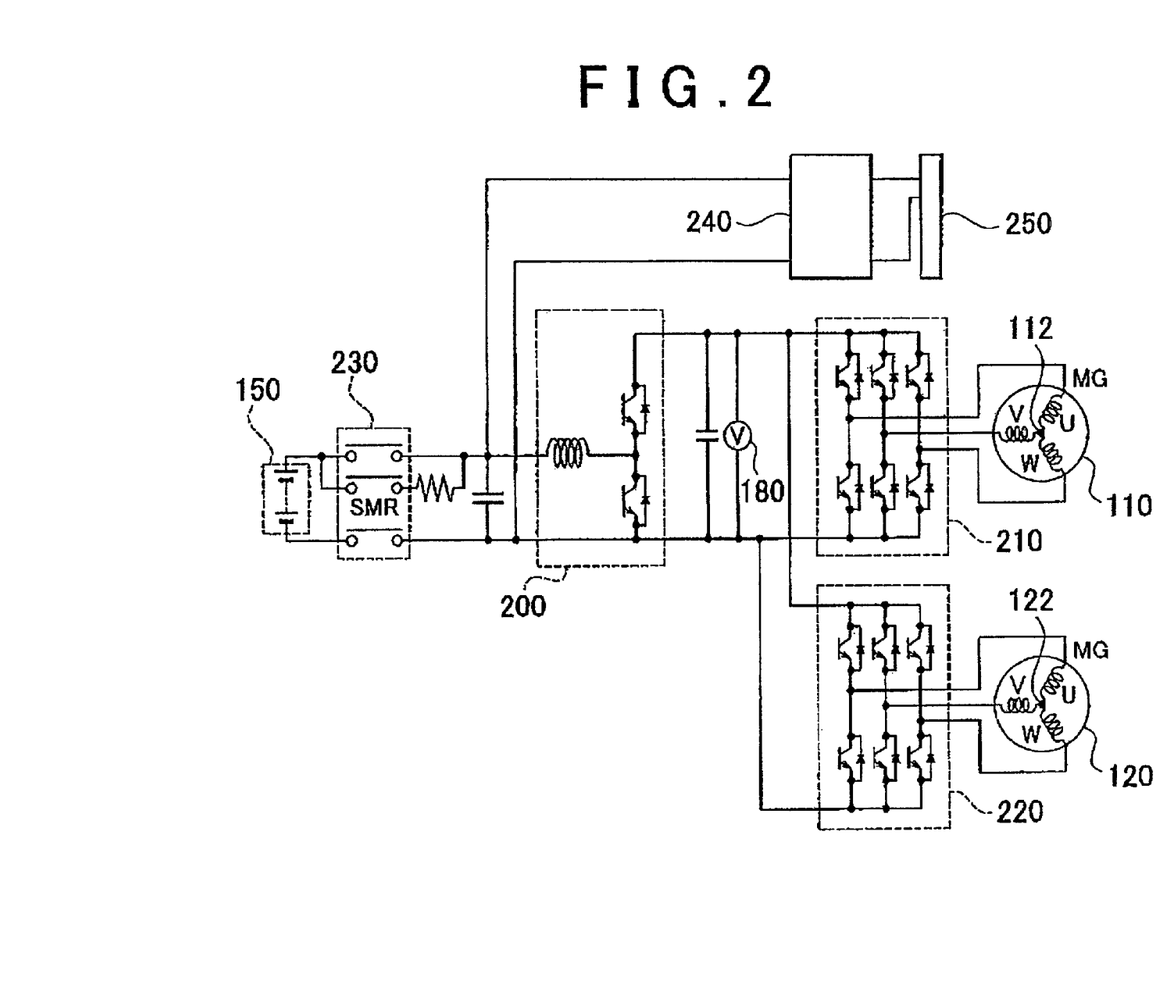
FIG. 2 is a first diagram showing an electric system of the plugin hybrid vehicle.

Referring to FIG. 2, an electric system of the plugin hybrid vehicle will be described. A converter 200, a first inverter 210, a second inverter 220, a System Main Relay (SMR) 230, a charger 240, and an inlet 250 are provided in the plugin hybrid vehicle.

The converter 200 includes a reactor, two npn type transistors, and two diodes. One end of the reactor is connected to a positive electrode side of each battery, and another end is connected to connection points of the two npn type transistors.

The two npn type transistors are connected in series. The npn type transistors are controlled by the ECU 170. A diode is connected between a collector and an emitter of each npn type transistor such that a current flows from the emitter side to the collector side.

Note that an Insulated Gate Bipolar Transistor (IGBT), for example, may be used as the npn type transistor. Instead of an npn type transistor, a power switching element such as a power Metal Oxide Semiconductor Field-Effect Transistor (MOSFET) may be used.

When power discharged from the battery 150 is supplied to the first motor/generator 110 or the second motor/generator 120, a voltage thereof is raised by the converter 200. Conversely, when power generated by the first motor/generator 110 or the second motor/generator 120 is charged to the battery 150, a voltage thereof is lowered by the converter 200.

A system voltage VH between the converter 200 and each inverter is detected by a voltage sensor 180. A detection result of the voltage sensor 180 is transmitted to the ECU 170.

The first inverter 210 includes a U phase arm, a V phase arm, and a W phase arm. The U phase arm, V phase arm, and W phase arm are connected in parallel. The U phase arm, the V phase arm, and the W phase arm each include two npn type transistors connected in series. A diode is connected between collectors and emitters of the respective npn, type transistors such that a current flows from the emitter side to the collector side. Connection points of the npn type transistors in the respective arms are connected respectively to different end portions to a neutral point 112 of each coil of the first motor/generator 110.

The first inverter 210 converts a direct current supplied from the battery 150 into an alternating current, and supplies the alternating current to the first motor/generator 110. The first inverter 210 also converts an alternating current generated by the first motor/generator 110 into a direct current.

The second inverter 220 includes a U phase arm, a V phase arm, and a W phase arm. The U phase arm, V phase arm, and W phase arm are connected in parallel. The U phase arm, the V phase arm, and the W phase arm each include two npn type transistors connected in series. A diode is connected between collectors and emitters of the respective npn type transistors such that a current flows from the emitter side to the collector side. Connection points of the npn type transistors in the respective arms are connected respectively to different end portions to a neutral point 122 of each coil of the second motor/generator 120.

The second inverter 220 converts a direct current supplied from the battery 150 into an alternating current, and supplies the alternating current to the second motor/generator 120. The second inverter 220 also converts an alternating current generated by the second motor/generator 120 into a direct current.

The converter 200, the first inverter 210, and the second inverter 220 are controlled by the ECU 170.

The SMR 230 is provided between the battery 150 and the charger 240. The SMR 230 is a relay that switches the battery 150 and the electric system between a connected condition and a disconnected condition. When the SMR 230 is open, the battery 150 is disconnected from the electric system. When the SMR 230 is closed, the battery 150 is connected to the electric system.

More specifically, when the SMR 230 is open, the battery 150 is electrically disconnected from the converter 200, the charger 240, and so on. When the SMR 230 is closed, the battery 150 is electrically connected to the converter 200, the charger 240, and so on.

The condition of the SMR 230 is controlled by the ECU 170. For example, when the ECU 170 is activated, the SMR 230 is closed, and when the ECU 170 is stopped, the SMR 230 is opened.

Figure 3:
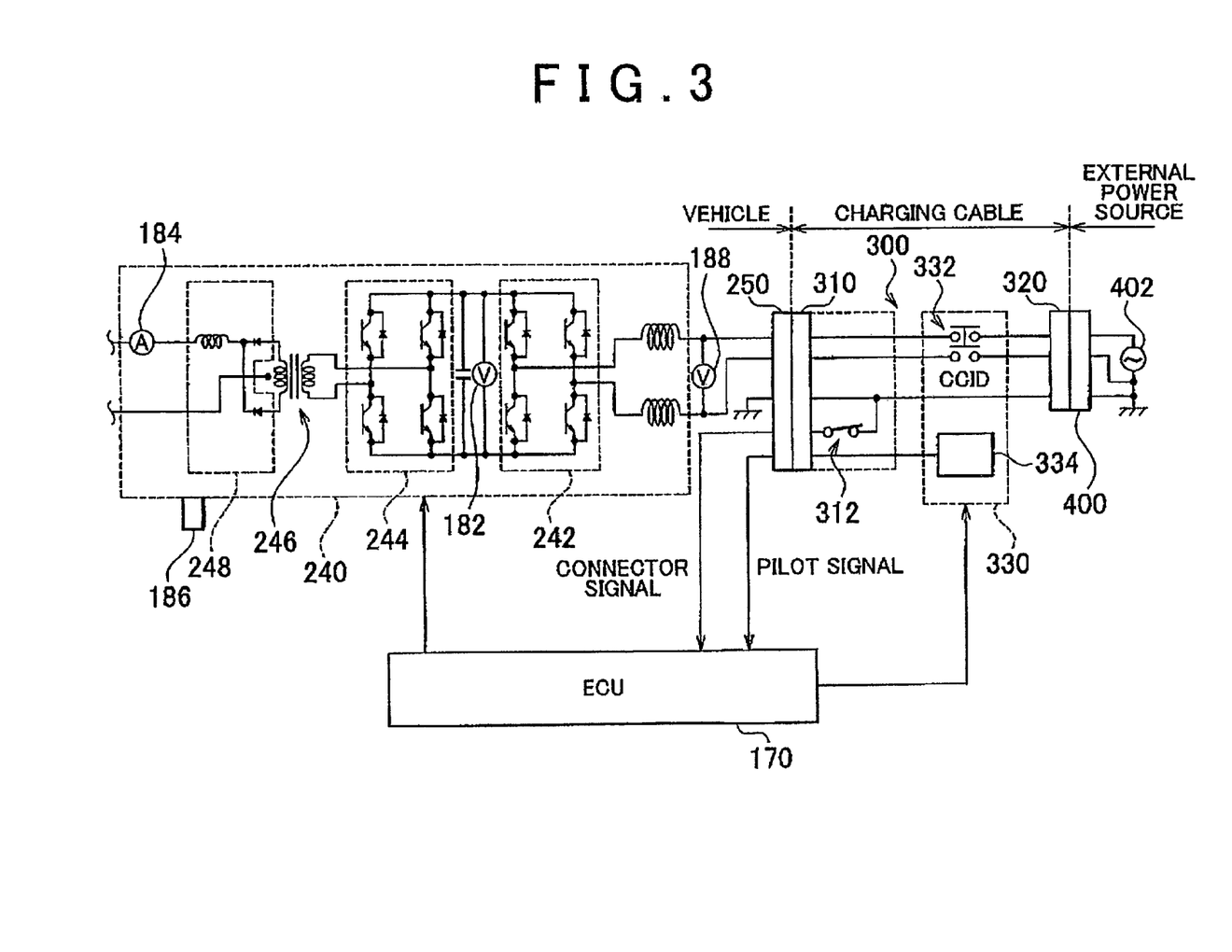
FIG. 3 is a second diagram showing the electric system of the plugin hybrid vehicle.

The charger 240 is connected between the battery 150 and the converter 200. As shown in FIG. 3, the charger 240 includes an AC/DC conversion circuit 242, a DC/AC conversion circuit 244, an isolation transformer 246, and a rectifying circuit 248.

The AC/DC conversion circuit 242 is constituted by a single phase bridge circuit. The AC/DC conversion circuit 242 converts alternating current power into direct current power on the basis of a drive signal from the ECU 170. The AC/DC conversion circuit 242 also functions as a boost chopper circuit for boosting a voltage using a coil as a reactor.

The DC/AC conversion circuit 244 is constituted by a single phase bridge circuit. The DC/AC conversion circuit 244 converts direct current power into high-frequency alternating current power on the basis of a drive signal from the ECU 170, and outputs the alternating current power to the isolation transformer 246.

The isolation transformer 246 includes a core constituted by a magnetic material, and a primary coil and a secondary coil wound around the core. The primary coil and secondary coil are electrically isolated and connected to the DC/AC conversion circuit 244 and the rectifying circuit 248, respectively. The isolation transformer 246 converts high-frequency alternating current power received from the DC/AC conversion circuit 244 to a voltage level corresponding to a turn ratio of the primary coil and the secondary coil, and outputs the voltage level to the rectifying circuit 248. The rectifying circuit 248 rectifies the alternating current power output by the isolation transformer 246 to direct current power.

A voltage between the AC/DC conversion circuit 242 and the DC/AC conversion circuit 244 (a voltage between terminals of a smoothing capacitor) is detected by a voltage sensor 182, and a signal representing a detection result is input into the ECU 170. Further, an output current of the charger 240 is detected by a current sensor 184, and a signal representing a detection result is input into the ECU 170. Moreover, a temperature of the charger 240 is detected by a temperature sensor 186, and a signal representing a detection result is input into the ECU 170.

When the battery 150 is charged from the power source on the vehicle exterior, the ECU 170 generates a drive signal for driving the charger 240 and outputs the generated drive signal to the charger 240.

In addition to a function for controlling the charger 240, the ECU 170 has a function for detecting a failure in the charger 240. When the voltage detected by the voltage sensor 182, the current detected by the current sensor 184, the temperature detected by the temperature sensor 186, and so on reach or exceed a threshold, a failure of the charger 240 is detected.

The inlet 250 is provided in a side portion of the plugin hybrid vehicle, for example. A connector 310 of a charging cable 300 for coupling the plugin hybrid vehicle to an external power source 402 is connected to the inlet 250.

The charging cable 300 for coupling the plugin hybrid vehicle to the external power source 402 includes the connector 310, a plug 320, and a Charging Circuit Interrupt Device (CCID) 330.

The connector 310 of the charging cable 300 is connected to the inlet 250 provided in the plugin hybrid vehicle. A switch 312 is provided on the connector 310. When the switch 312 is closed while the connector 310 of the charging cable 300 is connected to the inlet 250 provided in the hybrid plugin vehicle, a connector signal CNCT indicating that the connector 310 of the charging cable 300 is connected to the inlet 250 provided in the plugin hybrid vehicle is input into the ECU 170.

The switch 312 opens and closes in accordance with a latch fitting for latching the connector 310 of the charging cable 300 to the inlet 250 of the plugin hybrid vehicle. When an operator presses a button provided on the connector 310, the latch fitting rocks.

Figure 4:
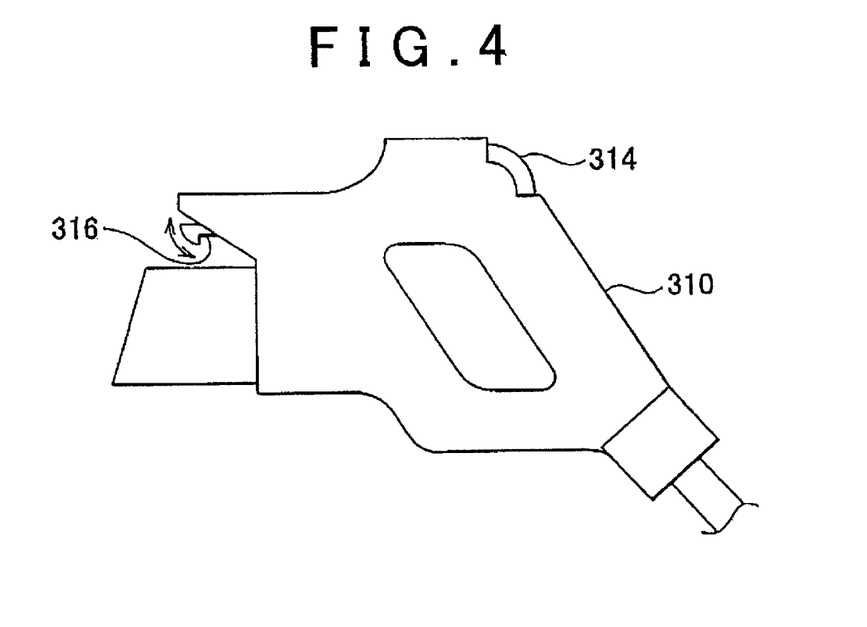
FIG. 4 is a view showing a connector of a charging cable.

For example, when the operator removes a finger from a button 314 of the connector 310 shown in FIG. 4, while the connector 310 of the charging cable 300 is connected to the inlet 250 provided in the plugin hybrid vehicle, the latch fitting 316 engages with the inlet 250 provided in the plugin hybrid vehicle and the switch 312 closes. When the operator presses the button 314, the engagement between the latch fitting 316 and the inlet 250 is released and the switch 312 opens. Note that the method of opening and closing the switch 312 is not limited to this method.

Returning to FIG. 3, the plug 320 of the charging cable 300 is connected to a plug socket 400 provided in a household. Alternating current power is supplied to the plug socket 400 from the power source 402 on the exterior of the plugin hybrid vehicle.

The CCID 330 includes a relay 332 and a control pilot circuit 334. When the relay 332 is open, a path for supplying power from the power source 402 on the exterior of the plugin hybrid vehicle to the plugin hybrid vehicle is blocked. When the relay 332 is open, power can be supplied to the plugin hybrid vehicle from the power source 402 on the exterior of the plugin hybrid vehicle. A condition of the relay 332 is controlled by the ECU 170 when the connector 310 of the charging cable 300 is connected to the inlet 250 in the plugin hybrid vehicle.

The control pilot circuit 334 transmits a pilot signal (a square wave signal) CPLT to a control pilot wire when the plug 320 of the charging cable 300 is connected to the plug socket 400, or in other words to the external power source 402, and the connector 310 is connected to the inlet 250 provided in the plugin hybrid vehicle. The pilot signal is oscillated from an oscillator provided in the control pilot circuit 334.

As long as the plug 320 of the charging cable 300 is connected to the plug socket 400, the control pilot circuit 334 is capable of outputting the fixed pilot signal CPLT even when the connector, 310 is removed from the inlet 250 provided in the plugin hybrid vehicle. However, when the connector 310 is removed from the inlet 250 provided in the plugin hybrid vehicle, the pilot signal CPLT cannot be detected by the ECU 170.

When the plug 320 of the charging cable 300 is connected to the plug socket 400 and the connector 310 is connected to the inlet 250 in the plugin hybrid vehicle, the control pilot circuit 334 oscillates the pilot signal CPLT at a predetermined pulse width (duty cycle).

The plugin hybrid vehicle is notified of a current capacity that can be supplied by the pulse width of the pilot signal CPLT. For example, the plugin hybrid vehicle is notified of the current capacity of the charging cable 300. The pulse width of the pilot signal CPLT is constant and does not therefore depend on the voltage and current of the external power source 402.

When a different type of charging cable is used, on the other hand, the pulse width of the pilot signal CPLT may be different. In other words, the pulse width of the pilot signal CPLT may be set for each type of charging cable.

In this embodiment, power supplied from the external power source 402 is charged to the battery 150 when the plugin hybrid vehicle is coupled to the external power source 402 by the charging cable 300. During charging of the battery 150, the SMR 230 and the relay 332 in the CCID 330 are closed.

An alternating current voltage VAC of the external power source 402 is detected by a voltage sensor 188 provided in the interior of the plugin hybrid vehicle. The detected voltage VAC is transmitted to the ECU 170.

Figure 5:
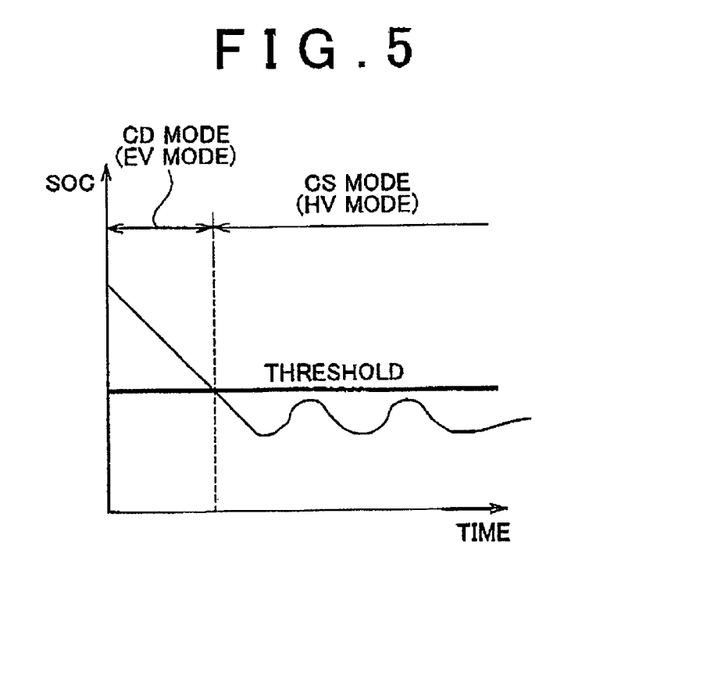
FIG. 5 is a view showing a region in which a Charge Sustaining (CS) mode is selected and a region in which a Charge Depleting (CD) mode is selected.

Referring to FIG. 5, the CS mode and the CD mode will be described further. The ECU 170 determines which mode to select from the CS mode and the CD mode. For example, when the state of charge of the battery 150 falls to or below a threshold, the CS mode is selected, and when the state of charge of the battery 150 is greater than the threshold, the CD mode is selected.

More specifically, when the state of charge of the battery 150 is equal to or smaller than the threshold or when the electric system of the plugin hybrid vehicle was last stopped in the CS mode, the CS mode is selected.

When the state of charge of the battery 150 is greater than the threshold and the battery 150 has a history of being charged by the power source 402 on the exterior of the plugin hybrid vehicle, or when the state of charge of the battery 150 is greater than the threshold and the electric system of the plugin hybrid vehicle was last stopped in the CD mode, the CD mode is selected. The ECU 170 controls charging of the battery 150, and therefore the determination as to whether or not the battery 150 has a history of being charged by the power source 402 on the exterior of the plugin hybrid vehicle is made in the interior of the ECU 170 using a flag or the like, for example. Note that the method of selecting the CS mode and the CD mode is not limited to this method.

In the CS mode and the CD mode, the plugin hybrid vehicle travels using drive power from at least one of the engine 100 and the second motor/generator 120.

Figure 6:
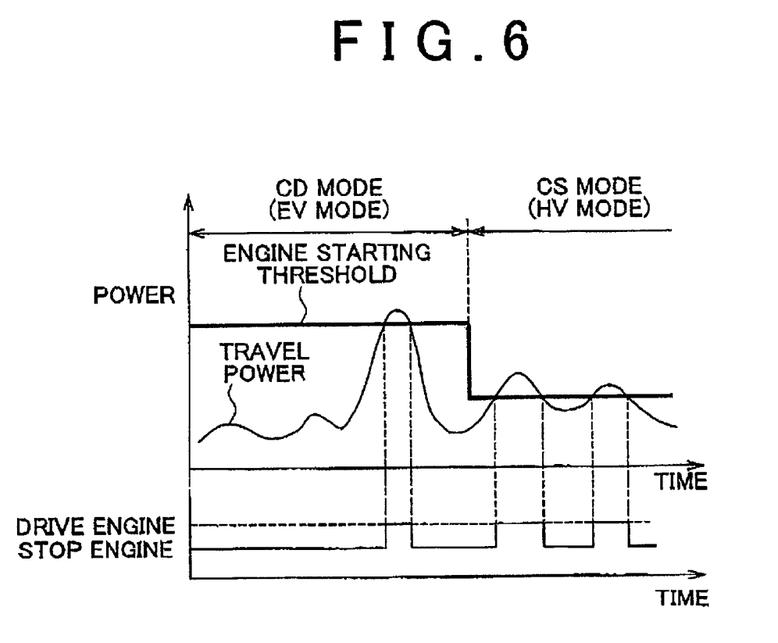
FIG. 6 is a view showing an engine driving period.

As shown in FIG. 6, when travel power of the plugin hybrid vehicle is smaller than an engine starting threshold, the plugin hybrid vehicle travels using only the drive power of the second motor/generator 120.

When the travel power of the plugin hybrid vehicle reaches or exceeds the engine starting threshold, on the other hand, the engine 100 is driven. As a result, the plugin hybrid vehicle travels using the drive power of the engine 100 in addition to, or instead of, the drive power of the second motor/generator 120. Further, power generated by the first motor/generator 110 using the drive power of the engine 100 is supplied directly to the second motor/generator 120.

As is evident from FIG. 6, a region in which the plugin hybrid vehicle is controlled in the CS mode includes a region where the engine 100 is stopped and a region where the engine 100 is driven. Similarly, a region in which the plugin hybrid vehicle is controlled in the CD mode includes a region where the engine 100 is stopped and a region where the engine 100 is driven.

The travel power is calculated by the ECU 170 in accordance with a map having a depression amount of an accelerator pedal operated by a driver (the accelerator opening), a vehicle speed, and so on as parameters. Note that the method of calculating the travel power is not limited to this method.

In this embodiment, the travel power is used as a parameter of the plugin hybrid vehicle, which is determined in response to an operation performed by the driver. Note that a torque, an acceleration, the drive power, the accelerator opening, and so on may also be used as parameters of the plugin hybrid vehicle.

The engine starting threshold of the CD mode is larger than the engine starting threshold of the CS mode. More specifically, the region of the CD mode in which the engine 100 is stopped such that the plugin hybrid vehicle travels using only the drive power of the second motor/generator 120 is larger than the region of the CS mode in which the engine 100 is stopped such that the plugin hybrid vehicle travels using only the drive power of the second motor/generator 120. Hence, in the CD mode, control is performed such that the engine 100 is stopped and the plugin hybrid vehicle mainly travels using only the drive power of the second motor/generator 120. In the CS mode, meanwhile, a driving frequency of the engine 100 is higher than a driving frequency of the engine 100 in the CD mode. Therefore, in the CS mode, control is performed such that the plugin hybrid vehicle travels efficiently using both the engine 100 and the second motor/generator 120.

Hereafter, the engine starting threshold of the CS mode will alto be referred to as a first engine starting threshold, while the engine starting threshold of the CD mode will also be referred to as a second engine starting threshold.

The power charged to the battery 150 in the CD mode is smaller than the power charged to the battery 150 in the CS mode. More specifically, in the CS mode, the charging power of the battery 150 is determined in accordance with the state of charge of the battery 150. The engine 100 is driven so that power corresponding to the determined charging power can be charged using the first motor/generator 110. In the CD mode, on the other hand, the charging power of the battery 150 is normally set at zero. In other words, power obtained through regenerative braking is charged to the battery 150 in the CD mode, but the engine 100 is not driven with the aim of charging the battery 150.

Hence, in the CD mode, the power stored in the battery 150, and in particular the power supplied from the power source 402 on the exterior of the plugin hybrid vehicle, is consumed actively.

Figure 7:
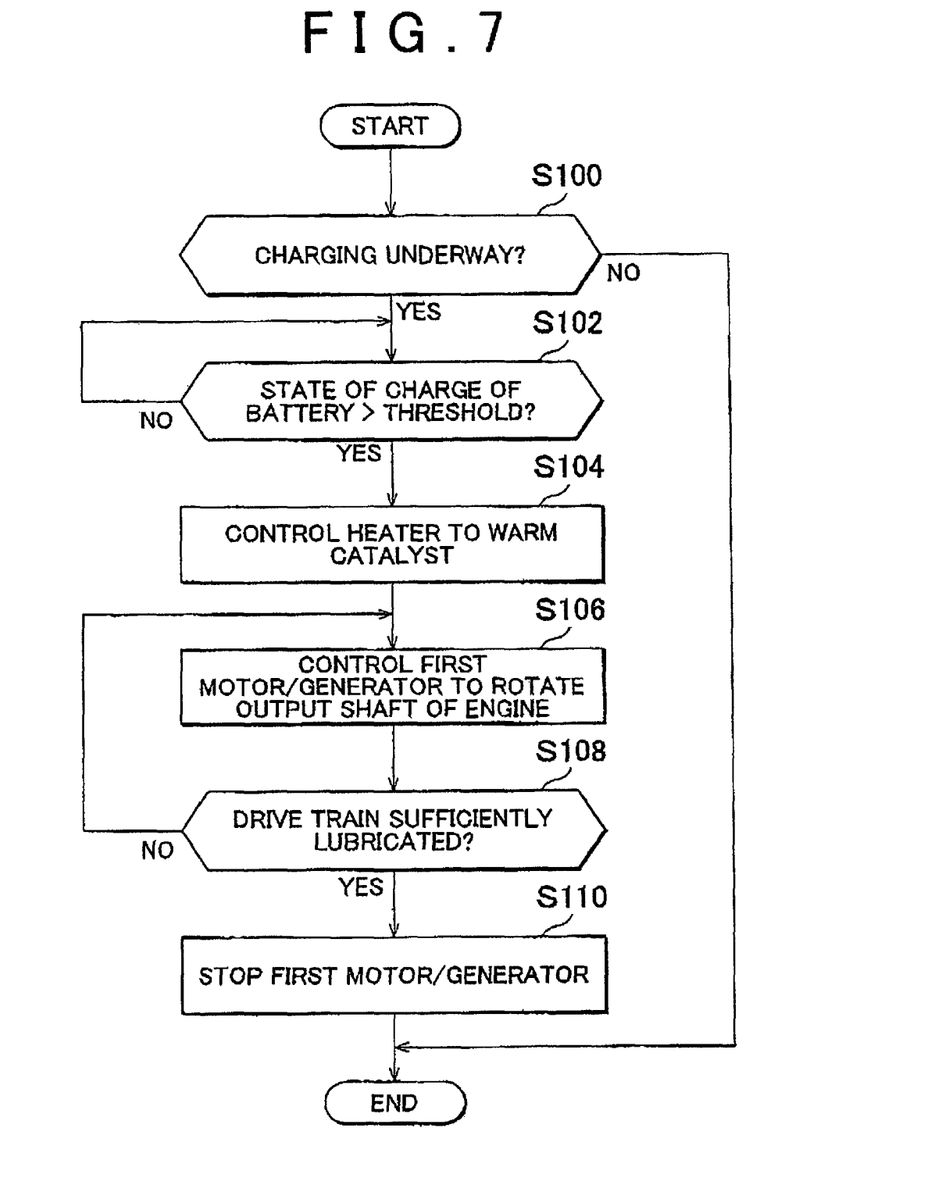
FIG. 7 is a flowchart showing a control structure of processing executed by an Electronic Control Unit (ECU) in the first embodiment.

Referring to FIG. 7, processing executed by the ECU 170 will be described. Note that the processing described below is executed repeatedly at predetermined period intervals, for example.

In a step (to be abbreviated hereafter to S) 100, the ECU 170 determines whether or not the battery 150 is being charged with power supplied from the power source 402 on the exterior of the plugin hybrid vehicle. When a charging current charged to the battery 150, which is detected using a current sensor or the like, equals or exceeds a threshold, for example, it is determined that the battery 150 is being charged. When the battery 150 is being charged (YES in S100), the processing advances to S102. When the battery 150 is not being charged (NO in S100), the processing is terminated.

In S102, the ECU 170 determines whether or not the state of charge of the battery 150 is greater than a threshold. When the state of charge of the battery 150 is greater than the threshold (YES in S102), the processing advances to S104. When the state of charge of the battery 150 is not greater than the threshold (NO in S102), the processing returns to S102.

In S104, the ECU 170 controls the heater 104 to warm the catalyst 102. Note that the heater 104 need not be controlled to warm the catalyst 102. In this case, a fuel injection amount may be increased when the engine 100 is operated subsequently.

In S106, the ECU 170 controls the first motor/generator 110 such that the output shaft of the engine 100 rotates.

In S108, a determination is made as to whether or not the drive train is sufficiently lubricated. For example, when the first motor/generator 110 has been controlled such that the output shaft of the engine 100 rotates for at least a predetermined time, it is determined that the drive train is sufficiently lubricated. When the drive train is sufficiently lubricated (YES in S108), the processing advances to S110. When the drive train is not sufficiently lubricated (NO in S108), the processing returns to S106.

In S110, the ECU 170 stops the first motor/generator 110. An operation of the first motor/generator 110 having the structure described above will now be described on the basis of the above flowchart.

Figure 8:
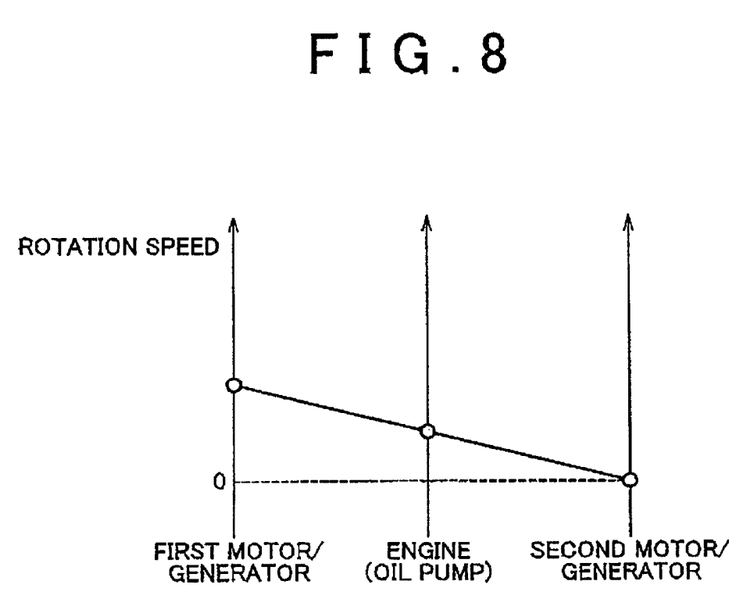
FIG. 8 is a collinear diagram showing a rotation speed of a first motor/generator, a rotation speed of a second motor/generator, and a rotation speed of an engine.

When the battery 150 is being charged by power supplied from the power source 402 on the exterior of the plugin hybrid vehicle (YES in S100) and the state of charge of the battery 150 is larger than the threshold (YES in S102), the heater 104 is controlled to warm the catalyst 102. For example, the heater 104 is controlled such that warming of the catalyst 102 is completed before the first motor/generator 110 is controlled such that the output shaft of the engine 100 rotates. The first motor/generator 100 is then controlled to rotate the output shaft of the engine 100 (S106). As shown in FIG. 8, when the first motor/generator 110 is driven, an output shaft rotation speed of the engine 100 increases. Thus, the oil pump 106 can be driven without consuming fuel such as gasoline. As a result, the oil pump 106 can be driven without an increase in fuel consumption.

When the drive train is sufficiently lubricated (YES in S108), the first motor/generator 110 is stopped (S110).

A second embodiment will now be described. In the second embodiment, the first motor/generator 110 is controlled such that the output shaft of the engine 100 rotates at a timing set by a user of the plugin hybrid vehicle while the battery 150 is charged by power supplied from the power source 402 on the exterior of the plugin hybrid vehicle. All other structures are identical to their counterparts in the first embodiment, and therefore detailed description of these structures will not be repeated.

Figure 9:
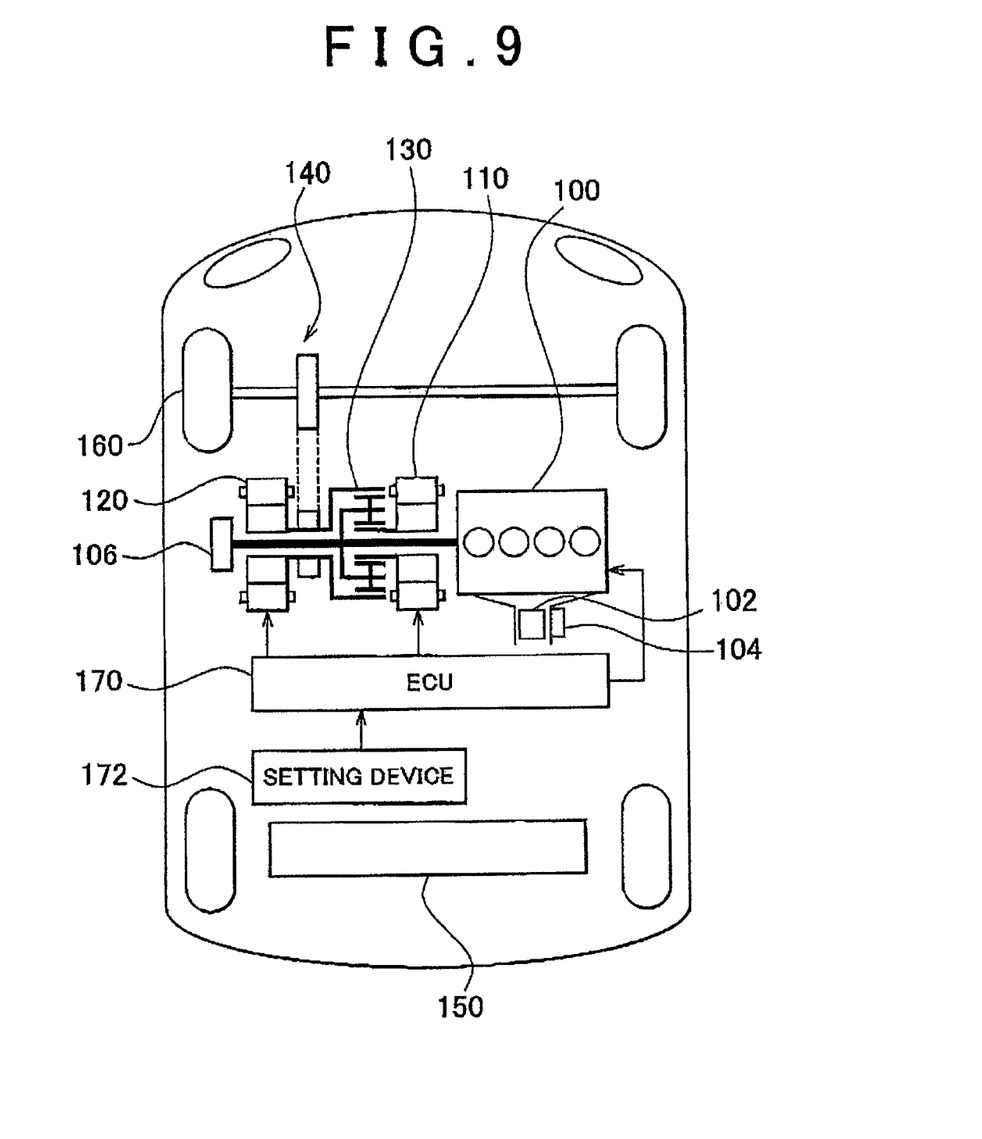
FIG. 9 is a schematic constitutional diagram showing a plugin hybrid vehicle according to a second embodiment.

As shown in FIG. 9, the plugin hybrid vehicle is further provided with a setting device 172. The setting device 172 includes a touch panel, a switch, and so on, for example. The setting device 172 sets a timing for controlling the first motor/generator 110 to rotate the output shaft of the engine 100 in response to an operation performed by the user of the plugin hybrid vehicle. For example, a timing for controlling the first motor/generator 110 to rotate the output shaft of the engine 100 is set within the period during which the battery 150 is charged with the power supplied from the power source 402 on the exterior of the plugin hybrid vehicle. For example, a first half or a second half of a period during which the battery 150 is charged with the power supplied from the power source 402 on the exterior of the plugin hybrid vehicle is set as the timing far controlling the first motor/generator 110 to rotate the output shaft of the engine 100. The period during which the battery 150 is charged with the power supplied from the power source 402 on the exterior of the plugin hybrid vehicle is calculated on the basis of the state of charge of the battery 150, the charging current charged to the battery 150, and so on for example. A period extending from the start of charging of the battery 150 to rotation of the output shaft of the engine 100 by the first motor/generator 110 may be set. The timing at which the first motor/generator 110 is controlled to rotate the output shaft of the engine 100 is not limited to the above timing.

Figure 10:
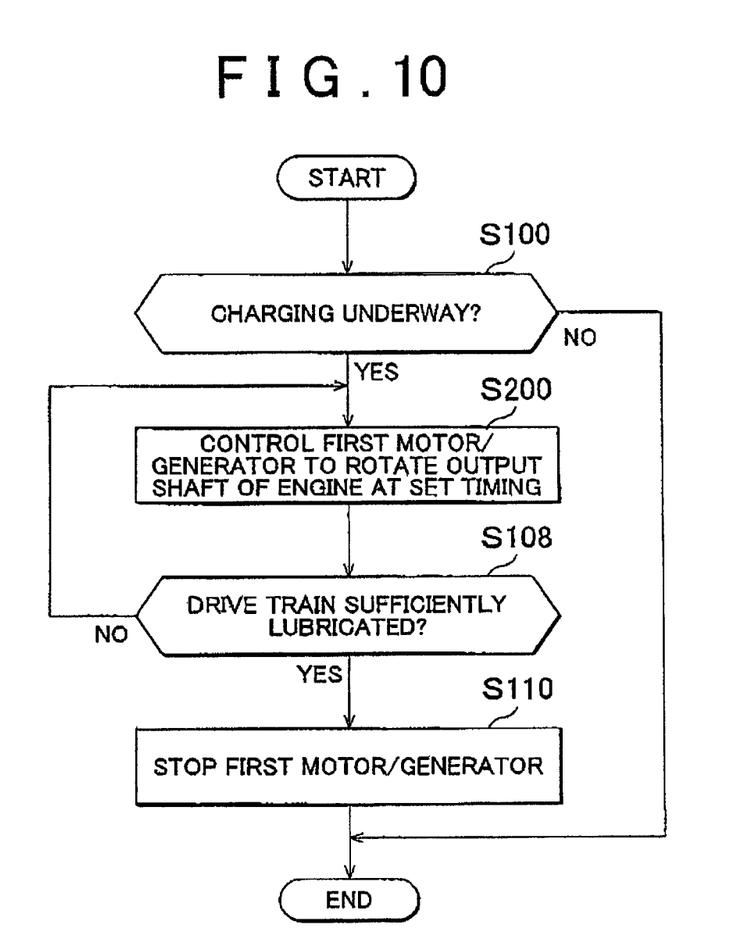
FIG. 10 is a flowchart showing a control structure of processing executed by an ECU in the second embodiment.

Referring to FIG. 10, processing executed by the ECU 170 will be described. Note that the processing described below is executed repeatedly at predetermined period intervals, for example. Identical processing to the first embodiment described above has been allocated identical step numbers, and detailed description thereof will not be repeated.

In S200, the ECU 170 controls the first motor/generator 110 to rotate the output shaft of the engine 100 at the timing set by the setting device 172 in response to an operation by the user of the plugin hybrid vehicle. Even when this processing is performed, similar effects to those of the first embodiment can be obtained.

A third embodiment will now be described. In the third embodiment, the first motor/generator 110 is controlled to rotate the output shaft of the engine 100 when an air-conditioning device is operated while the battery 150 is charged with power supplied from the power source 402 on the exterior of the plugin hybrid vehicle. All other structures are identical to their counterparts in the first embodiment, and therefore detailed description of these structures will not be repeated.

Figure 11:
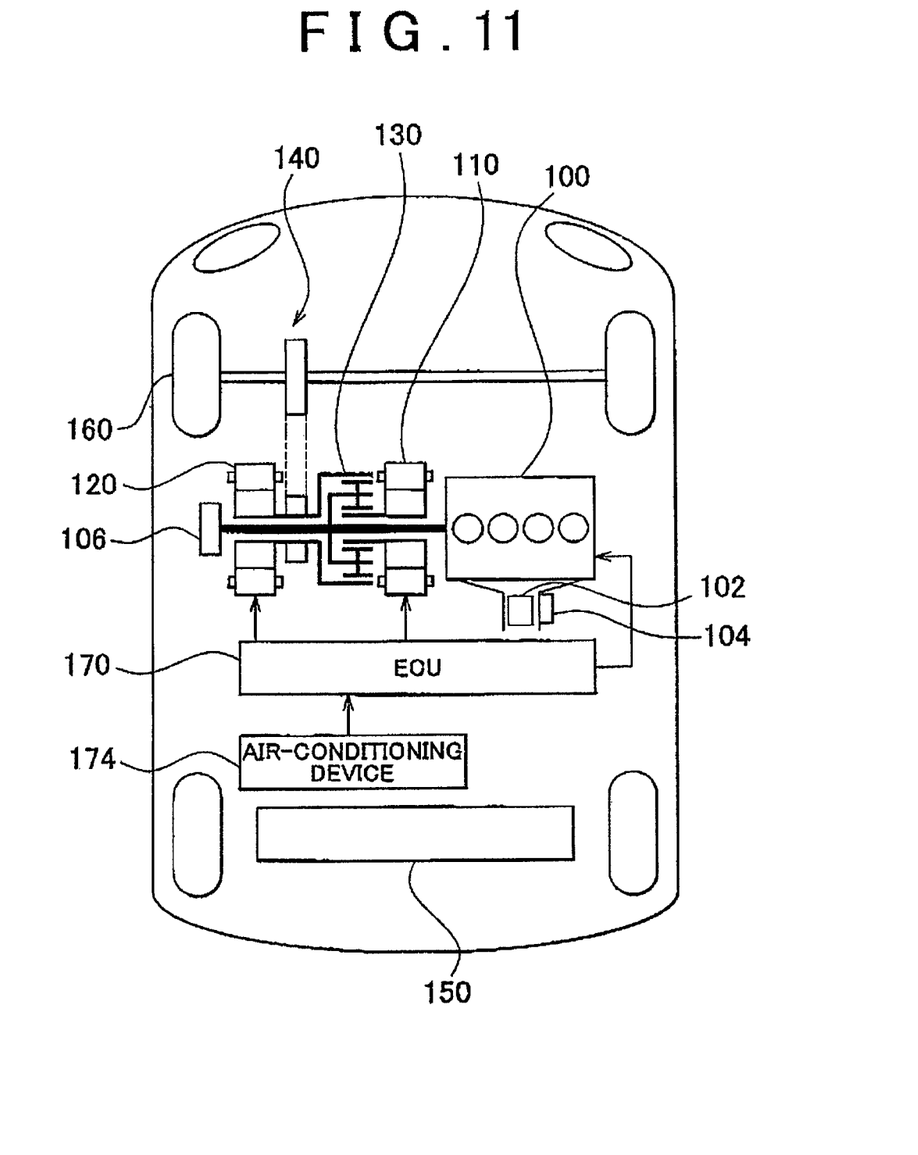
FIG. 11 is a schematic constitutional diagram showing a plugin hybrid vehicle according to a third embodiment.

As shown in FIG. 11, the plugin hybrid vehicle is further provided with an air-conditioning device 174. The air-conditioning device 174 adjusts an internal temperature of a vehicle cabin in response to an operation performed by the user of the plugin hybrid vehicle, for example. In this embodiment, the air-conditioning device 174 operates in response to an operation performed by the user on the exterior of the plugin hybrid vehicle using a remote controller or the like, for example.

Figure 12:
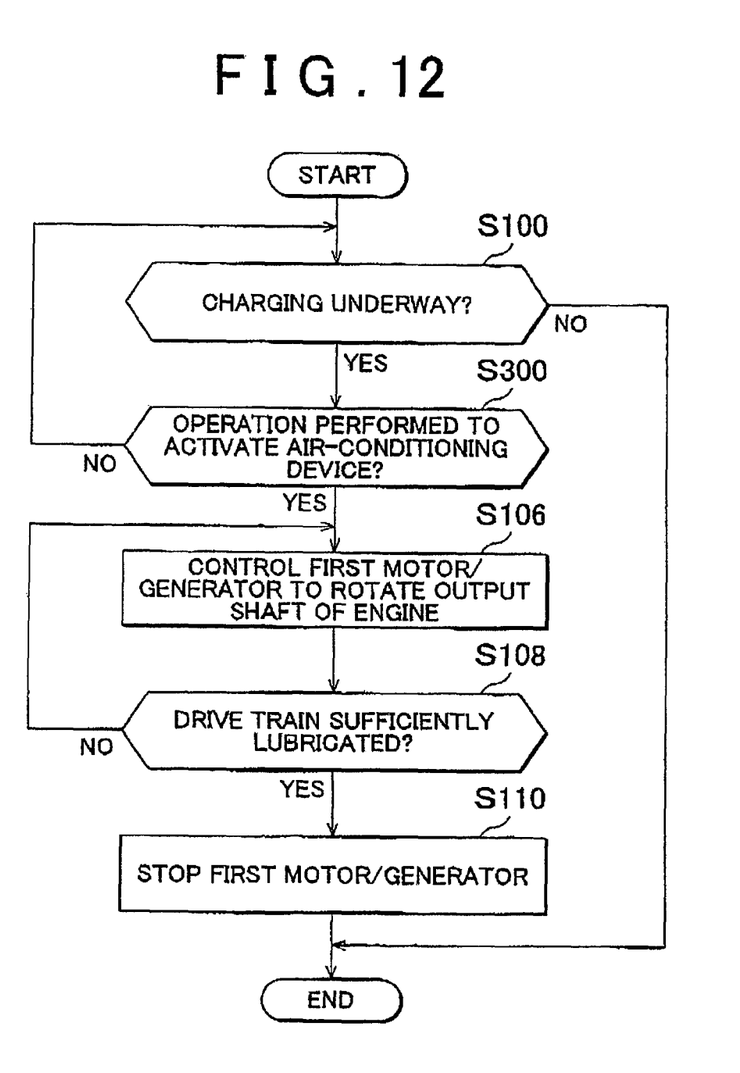
FIG. 12 is a flowchart showing a control structure of processing executed by an ECU in the third embodiment.

Referring to FIG. 12, processing executed by the ECU 170 will be described. Note that the processing described below is executed repeatedly at predetermined period intervals, for example. Identical processing to the first embodiment described above has been allocated identical step numbers, and detailed description thereof will not be repeated.

In S300, the ECU 170 determines whether or not the user of the plugin hybrid vehicle has performed an operation from the exterior of the plugin hybrid vehicle to activate the air-conditioning device 174. When the user of the plugin hybrid vehicle has performed an operation from the exterior of the plugin hybrid vehicle to activate the air-conditioning device 174 (YES in S300), the processing advances to S106. When such an operation has not been performed (NO in S300), the processing returns to S100. In so doing, similar effects to those of the first embodiment can be obtained.

The first to third embodiments may be combined as desired. For example, in the second and third embodiments the heater 104 may be controlled to warm the catalyst 102 when the first motor/generator 110 is controlled to rotate the output shaft of the engine 100.

Further, the first motor/generator may be controlled to rotate the output shaft of the engine 100 during charging of the battery 150 when a condition, according to which a ratio of a distance or a time traveled using only the second motor/generator as a drive source has reached or exceeded a threshold between previous charging of the battery 150 using the external power source 402 and current charging of the battery 150 using the external power source 402, is satisfied.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the spirit and scope of the disclosure.

The invention claimed is:

1. A vehicle control system for a vehicle that is installed with an internal combustion engine, an oil pump coupled to an output shaft of the internal combustion engine to be driven by the internal combustion engine, and a storage device for storing power, and that is capable of traveling using the power stored in the storage device, the vehicle control system comprising:

a rotating electrical machine coupled to the output shaft of the internal combustion engine; and a control device configured to control the rotating electrical machine to rotate the output shaft of the internal combustion engine to drive the oil pump to lubricate a drive train of the vehicle during charging of the storage device with power supplied from an exterior of the vehicle, wherein the control device controls the rotating electrical machine to rotate the output shaft of the engine during charging of the battery when a ratio of a distance or a ratio of a time traveled using only the rotating electrical machine as a drive source with respect to a total distance or a total time traveled between previous charging of the storage device from the exterior and current charging of the storage device from the exterior has reached or exceeded a threshold.

2. The vehicle control system according to claim 1, wherein the control device controls the rotating electrical machine to rotate the output shaft of the internal combustion engine when a state of charge of the storage device is larger than a threshold during charging of the storage device using the power supplied from the exterior of the vehicle.

3. The vehicle control system according to claim 1, further comprising a setting device that sets a timing for controlling the rotating electrical machine to rotate the output shaft of the internal combustion engine in response to an operation performed by a user of the vehicle, wherein the timing is set within the period during which the storage device is charged with the power supplied from the exterior of the vehicle, wherein the control device controls the rotating electrical machine to rotate the output shaft of the internal combustion engine at the timing set by the setting device during charging of the storage device using the power supplied from the exterior of the vehicle.

4. The vehicle control system according to claim 1, further comprising an air-conditioning device that operates in response to an operation performed by a user of the vehicle from the exterior of the vehicle, wherein the control device controls the rotating electrical machine to rotate the output shaft of the internal combustion engine when the user of the vehicle performs an operation from the exterior of the vehicle to operate the air-conditioning device during charging of the storage device using the power supplied from the exterior of the vehicle.

5. The vehicle control system according to claim 1, further comprising:

a catalyst for purifying an exhaust gas discharged from the internal combustion engine; and a heater for warming the catalyst, wherein the heater is controlled to warm the catalyst when the rotating electrical machine is controlled to rotate the output shaft of the internal combustion engine.

6. A vehicle control system for a vehicle that is installed with an internal combustion engine, an oil pump coupled to an output shaft of the internal combustion engine to be driven by the internal combustion engine, and a storage device for storing power, and that is capable of traveling using the power stored in the storage device, the vehicle control system comprising:

a rotating electrical machine coupled to the output shaft of the internal combustion engine; and a control device configured to:

control the rotating electrical machine to rotate the output shaft of the internal combustion engine, when a drive train of the vehicle is not lubricated, during charging of the storage device with power supplied from an exterior of the vehicle; and control the rotating electrical machine to stop the output shaft of the internal combustion engine, when a drive train of the vehicle is lubricated, during charging of the storage device with power supplied from an exterior of the vehicle, wherein the control device controls the rotating electrical machine to rotate the output shaft of the engine during charging of the battery when a ratio of a distance or a ratio of a time traveled using only the rotating electrical machine as a drive source with respect to a total distance or a total time traveled between previous charging of the storage device from the exterior and current charging of the storage device from the exterior has reached or exceeded a threshold.

* * * * *